United States Patent [19]
Camfield et al.

[11] Patent Number: 5,782,540
[45] Date of Patent: Jul. 21, 1998

[54] PLASTIC WHEEL AND METHOD OF MAKING SAME

[75] Inventors: David K. Camfield; Daniel F. Brashear, both of Olney, Ill.; Robert N. Conn, Seneca, Mo.

[73] Assignee: Brunswick Corporation, Lake Forest, Ill.

[21] Appl. No.: 723,860

[22] Filed: Sep. 30, 1996

Related U.S. Application Data

[63] Continuation-in-part of Ser. No. 652,014, May 21, 1996, abandoned.

[51] Int. Cl.$^6$ ............................. B60B 1/00; B60B 3/08
[52] U.S. Cl. ..................... 301/64.4; 301/64.2; 301/64.7
[58] Field of Search ........................... 301/63.1, 64.2, 301/64.3, 64.4, 64.5, 64.7, 104, 95; 29/894.322, 894.341, 894.342, 894.34

[56] References Cited

U.S. PATENT DOCUMENTS

| | | |
|---|---|---|
| D. 244,272 | 5/1977 | Raudman, Jr. et al. . |
| D. 303,516 | 9/1989 | Arredondo, Jr. . |
| 763,145 | 6/1904 | Brennan . |
| 1,411,665 | 4/1922 | Kirchner . |
| 1,412,034 | 4/1922 | Banschbach ............ 301/64.4 X |
| 1,518,369 | 12/1924 | Stolp . |
| 1,602,984 | 10/1926 | McFall ..................... 301/64.4 X |
| 1,845,802 | 2/1932 | Laddon et al. ............ 301/64.3 |
| 1,967,401 | 7/1934 | Frank ........................ 301/64.3 X |
| 2,551,763 | 5/1951 | Schley ...................... 301/64.4 |
| 2,606,076 | 8/1952 | Frazer ....................... 301/64.4 |
| 3,158,404 | 11/1964 | Noakes . |
| 3,656,531 | 4/1972 | Ross et al. . |
| 3,695,728 | 10/1972 | Haussels ................... 301/64.7 X |
| 3,695,729 | 10/1972 | Schwerdhofer . |
| 3,862,779 | 1/1975 | Jayne . |
| 4,280,736 | 7/1981 | Raudman . |
| 4,511,184 | 4/1985 | Schauf et al. . |
| 4,588,542 | 5/1986 | Pierce . |
| 4,639,046 | 1/1987 | Oleff et al. . |
| 4,732,428 | 3/1988 | Monte . |
| 4,793,659 | 12/1988 | Oleff et al. . |
| 4,818,034 | 4/1989 | Djerf . |
| 4,844,552 | 7/1989 | Tsygankov et al. . |
| 4,919,490 | 4/1990 | Hopkins et al. . |
| 4,930,843 | 6/1990 | Lewis . |
| 4,930,844 | 6/1990 | Giroux . |
| 4,983,430 | 1/1991 | Sargent . |
| 4,995,675 | 2/1991 | Tsai . |
| 5,061,013 | 10/1991 | Hed et al. . |
| 5,080,444 | 1/1992 | Hopkins et al. . |
| 5,184,874 | 2/1993 | Olson et al. . |
| 5,246,275 | 9/1993 | Arredondo, Jr. . |
| 5,249,846 | 10/1993 | Martin et al. . |
| 5,415,463 | 5/1995 | Olson et al. . |
| 5,564,793 | 10/1996 | Whiteford ................. 301/64.7 |

FOREIGN PATENT DOCUMENTS

| | | | |
|---|---|---|---|
| 482089 | 4/1952 | Canada . | |
| 880 700 | 6/1953 | Germany . | |
| 3620097 | 12/1987 | Germany ................. | 301/64.7 |
| 289349 | 8/1935 | Italy ........................ | 301/64.4 |
| 74931 | 4/1949 | Norway . | |

*Primary Examiner*—Russell D. Stormer
*Attorney, Agent, or Firm*—Steven P. Shurtz; Brinks Hofer Gilson & Lione

[57] ABSTRACT

A plastic wheel assembly comprises a wheel, a hub assembly and a rim having two side walls adopted to hold a tire onto the rim. Preferably the wheel is made of two molded plastic wheel halves, each having a wheel flange extending outwardly from the circumference of the wheel and contacting the rim side walls. The rim fits between the wheel flanges and is preferably made of metal. The wheel halves are preferably riveted to the flanges on the hub assembly. A method of making the wheel assembly involves connecting the first wheel half to the rim and then connecting the second wheel half to the combination of the rim and first wheel half.

31 Claims, 7 Drawing Sheets

PLASTIC WHEEL AND METHOD OF MAKING SAME

CROSS REFERENCE TO RELATED APPLICATION

This application is a continuation-in-part of application Ser. No. 08/652,014, filed May 21, 1996, which is hereby incorporated by reference.

BACKGROUND OF THE INVENTION

The present invention relates to wheels, and more specifically plastic wheels and methods of making the same. The present invention is particularly useful with regard to bicycle wheels.

Traditional bicycle wheels, and wheels for many other uses, have been made with a metal hub and rim connected by numerous wire spokes. Several patents point out problems with the wire spoke wheel and suggest wheel structures to avoid those problems. For example, many patents have focused on the poor aerodynamics of wire spoke wheels. U.S. Pat. No. 4,732,428 discloses a bicycle wheel with a streamlined configuration. The wheel is made out of two circular half wheels, hollow inside. The wheel halves can be made of an aluminum extrusion or fiber reinforced plastic. The external circumferential edges can be superimposed and riveted together. One problem with this design, however, is that the sides of the wheel are fully closed, which can create problems with cross wind stability.

Some patents disclose plastic wheels with several large plastic spokes, often aerodynamically shaped. The use of these large spokes reduces the problem with cross wind stability of earlier plastic wheels. U.S. Pat. No. 4,919,490 discloses such a wheel. The wheel is made by placing a metal rim and hub in a mold and injecting plastic that expands to form foam that is bonded to the rim and the hub. The foam is then covered with fabric and an adhesive to provide a rigid, strong outer layer to the wheel.

Other patents have focused on the cost of producing wire spoke wheels, with their numerous parts that often must be hand assembled and then tightened individually to "true" the wheel. In this regard, U.S. Pat. No. 3,862,779 discloses a wheel made either of one piece of molded plastic, or two wheel halves fastened together. The wheel is molded to provide a space for either a metal hub assembly or for use of bearing races placed into recesses in the plastic hub. A rim formed on the circumference of the wheel includes two side walls that are used to hold a tire onto the rim. The rim is of the same material as the rest of the wheel.

Molded plastic wheels have another benefit in that they can be designed with new and interesting shapes. Some plastic bicycle wheels are known as "mag wheels," and they have aesthetically appealing spoke designs. For example, U.S. Design Pat. No. Des. 244,272 discloses what appears to be an all plastic "mag" wheel.

Prior art plastic wheels have a number of drawbacks. Most importantly is the cost. Wheels made entirely of plastic are typically made of fiber reinforced plastic so that the rim side walls have sufficient strength to hold a tire onto the wheel and withstand the impact encountered as the wheel is ridden over rough surfaces, or objects such as a curb. The use of high strength, fiber reinforced plastic with a thickness to withstand the loads and stresses encountered while the bicycle is ridden drives up the cost of plastic wheels. Another problem that some plastic wheels can have is that heat generated within the hub coaster brake can cause the plastic attached to the hub housing to soften, compromising the wheel's strength.

U.S. Pat. No. 4,280,736 discloses a plastic wheel in which the hub assembly is mounted to the wheel via lugs on the ends of the metal housing so as to provide an elongated heat path for transmission of heat to the wheel. One drawback to the disclosed wheel is that it uses an unusual hub design, adding to the cost of the wheel.

U.S. Pat. No. 5,246,275 discloses a wheel in which a metal rim is bonded to a plastic wheel. However, the wheel itself is expensive to make, being made of a layered composite of overlaid plies of fiber, such as graphite and fiberglass bonded together with epoxy. The wheel is made over a hollow, inflatable mandrel.

While some plastic wheel constructions might work well for small wheels, as wheels get larger it is harder to hold down the cost and weight of the wheel while at the same time providing sufficient strength in the wheel.

Even with all of the foregoing improvements, there is still a need for a wheel that is strong and lightweight like a traditional wire spoke wheel, but that does not require assembly from multiple pieces that require hand tightening, and is less expensive than prior art plastic wheels.

SUMMARY OF THE INVENTION

Plastic wheels have been invented which are strong and lightweight like wire spoke wheels, made of relatively few pieces that do not require hand tightening or adjustment, and are less expensive than known prior art plastic wheels. In one aspect the invention is a wheel assembly comprising a hub assembly comprising an axle and a bearing assembly; two molded plastic wheel halves connected to the hub assembly so as to form a wheel rotatable about the axle and having a circumference; and a rim attached to the circumference and having two side walls adapted to hold a tire onto the rim. Because the rim is a separate piece, it can be made of metal or some other high strength material, yet the plastic wheel halves can be molded of inexpensive resins.

In a second aspect, the invention is a wheel assembly comprising a plastic wheel having a circumference with two flanges extending outwardly from the circumference, and a rim attached to the plastic wheel on the circumference and in between the wheel flanges, the rim having two side walls adapted to hold a tire onto the rim and the rim side walls contacting the wheel flanges. The use of wheel flanges with a separate rim in between the wheel flanges provides sufficient strength to hold the rim onto the rest of the wheel even when sizeable side loading forces are applied between the tire and the wheel. In this way a lightweight plastic wheel can still be used with a separate, more sturdy rim, and the rim and wheel are held together in a sturdy fashion.

Because of the unique aspect of wheel flanges used in the second aspect of the invention, a unique assembly technique has also been invented to make a wheel out of two molded plastic halves, as in the first aspect of the invention. Thus in another aspect the invention is a method of making a wheel assembly comprising the steps of providing first and second molded, plastic wheel halves each having a wheel flange thereon and a rim having two side walls adapted to hold a tire onto said rim; connecting the first wheel half to the rim to form a combination; and connecting the second wheel half to the combination of the first wheel half and rim such that the wheel flanges on the first and second wheel halves contact the rim side walls. Using this assembly technique, a wheel can easily be constructed using two plastic wheel halves that each have a wheel flange on them. Otherwise, the

3 wheel flanges would prevent a round rim having an inside diameter equal to the circumference of the wheel from being placed on the wheel.

These and other advantages of the invention, as well as the invention itself, will be best understood in view of the attached drawings.

DETAILED DESCRIPTION OF THE DRAWINGS AND PREFERRED EMBODIMENTS OF THE INVENTION

Figure 7:
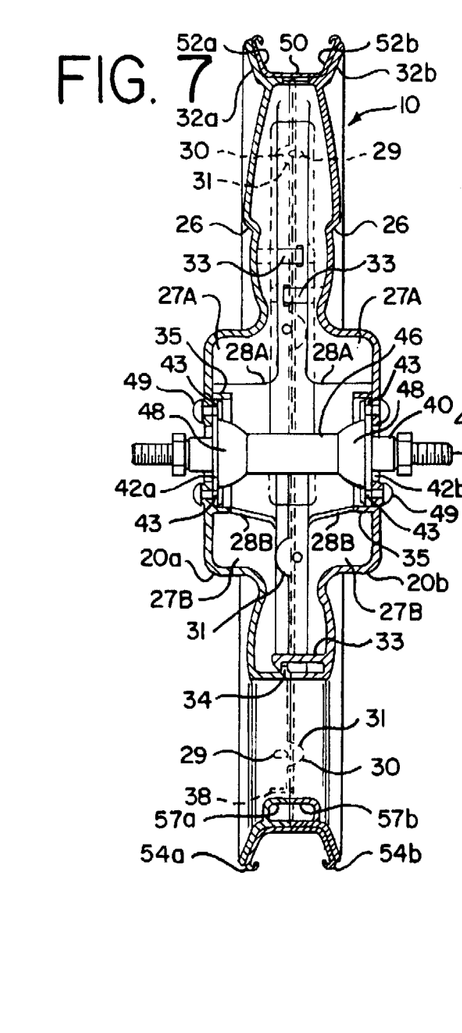
FIG. 7 is a cross-sectional view through a wheel assembly using the plastic wheel of FIG. 1.
Figure 8:
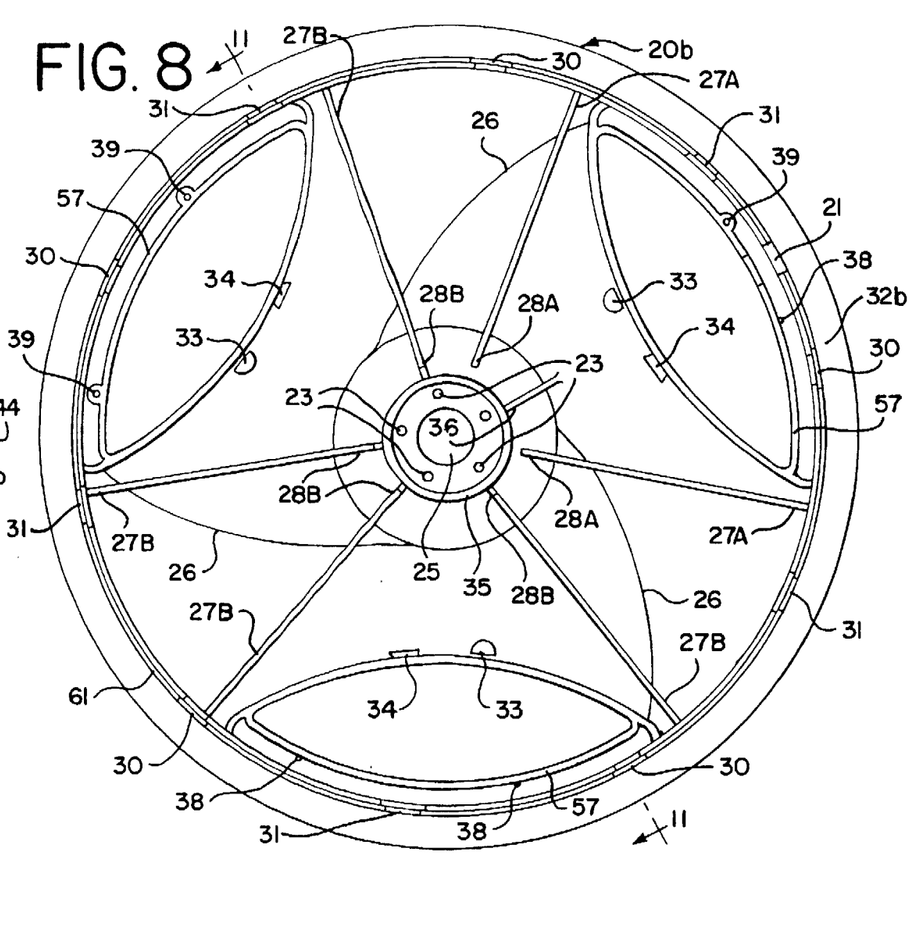
FIG. 8 is a side elevational view of the inside surface of one of the wheel halves used to make the wheel of FIG. 1.
Figures 9, 10:
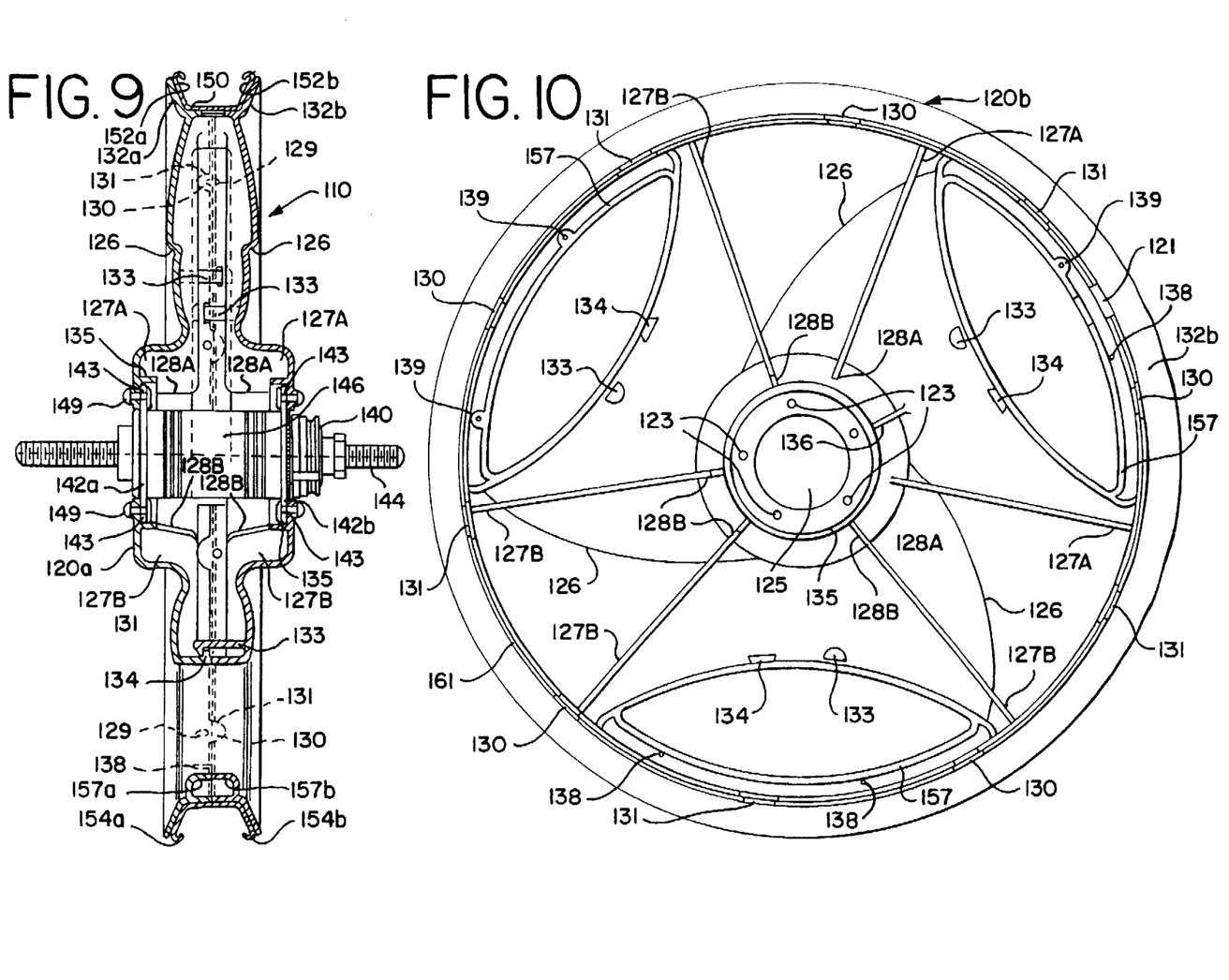
FIG. 9 is a cross-sectional view through a wheel assembly using the plastic wheel of FIG. 4.
FIG. 10 is a side elevational view of the inside surface of one of the wheel halves used to make the wheel of FIG. 4.

Two preferred embodiments of the present invention are shown in the attached FIGS. 1–12. Furthermore, while only a plastic wheel or portion thereof is shown in most of the figures, FIGS. 7 and 9 show the two embodiments in a completed wheel assembly. The two embodiments are very similar, the first being used for the front wheel of a bicycle, the second being used for the rear wheel of a bicycle. The plastic wheel 20 of the first embodiment is used in the front wheel assembly 10 shown in FIG. 7. The plastic wheel 120 of the second embodiment is used in the rear wheel assembly 110 shown in FIG. 9. The front wheel assembly 10 will be described in detail first, and then differences in the rear wheel assembly 110 will be pointed out.

The front wheel assembly 10 (FIG. 7) includes three major components, the plastic wheel 20, a hub assembly 40 and a rim 50.

The preferred plastic wheel 20 (FIGS. 1–3) is made of two molded wheel halves 20a and 20b which are identical to one another, and can be produced using the same mold tool. Because the halves are identical, their components are also identical, and will be identified herein with the same reference numbers, with the suffix a and b added when necessary to differentiate between components of separate wheel halves. The two wheel halves 20a and 20b mate at the wheel circumference, leaving a hole 21 through which an inflation stem of a bicycle tube may pass. The wheel 20 has a plurality of spokes 22, preferably three, extending from the central region of the wheel toward the circumference, with spaces therebetween.

4

The spokes 22 are formed as part of an outer surface of the plastic wheel that extends between the hub assembly 40 and the rim 50. In the center region of this outer surface is a raised surface with five small holes 23 therethrough used for attaching the wheel halves 20a and 20b to the hub assembly 40, as well as a larger hole 25 in the center through which an axle may pass. A boss 24 is provided around each hole 23 so that the plastic in the area of attachment is thicker, and hence stronger, than in other portions of the wheel 20. Also included in the outer surface of the wheel are a plurality of curved ridges 26, one on each of the spokes. These curved ridges add to the aesthetic appearance of the wheel, as well as provide added strength in the molded plastic wheel halves.

In the spaces between the spokes and adjacent the circumference, the plastic wheel halves each include a cover member 57. The cover members 57a and 57b of respective wheel halves mate at the junction of the two wheel halves 20a and 20b. Their function is mostly decorative, as explained below.

A plurality of stiffening ribs are provided on the inside surface of each wheel half 20a and 20b (FIG. 8). In the preferred embodiment, there are six stiffening ribs 27A and 27B, two on the back of each spoke 22. The ribs 27A and 27B extend generally radially, but do not contact one another. Two of the ribs 27A on each wheel half terminate at free ends 28A spaced from the hub assembly 40 (FIGS. 7–8), while four of the ribs 27B on each wheel half terminate at ends 28B joined to a circular wall 35 surrounding the hub area. A gusset 36 connects to the circular wall 35 in between the two ribs 27A that do not connect to the wall 35. However, these ribs and the circular wall 35 do not have a height as great as the depth of the wheel half. In fact, in the center of the wheel 20, the wheel halves 20a and 20b are not connected. (See FIG. 7.) Instead, they are spaced apart from one another on the hub assembly 40.

The preferred hub assembly 40 (FIG. 7) is of a standard design used with wire spoke wheels, with one exception. The hub assembly 40 includes first and second hub flanges 42a and 42b on opposite ends of a hub housing 46, and an axle 44 extending through the hub housing 46 rotatably supported by a bearing assembly 48 of conventional design. The bearing assembly 48 allows the wheel 20 to rotate about the axle 44.

Figure 1:
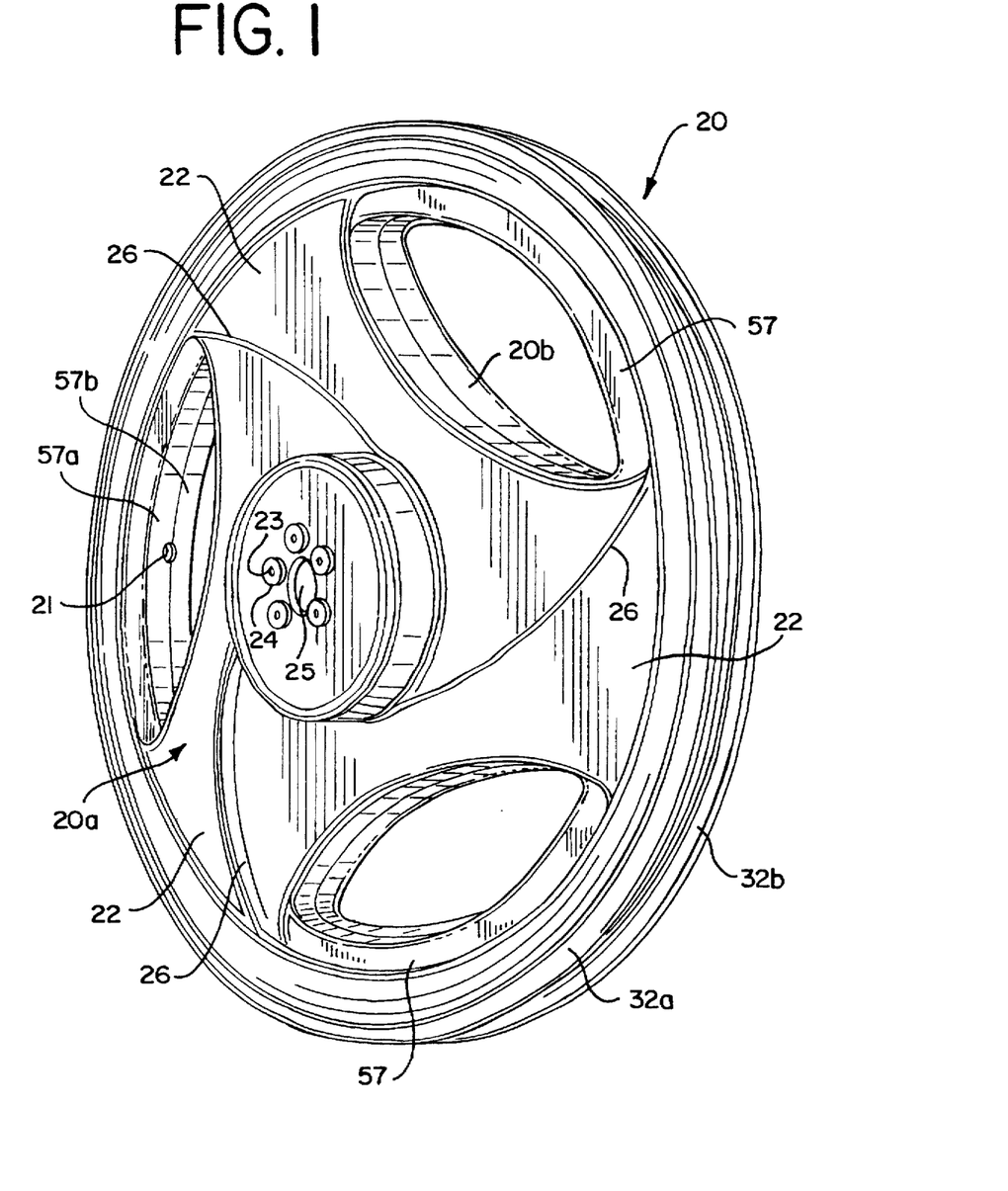
FIG. 1 is a perspective view of a plastic wheel of the present invention used as a front wheel for a bicycle.
Figure 2:
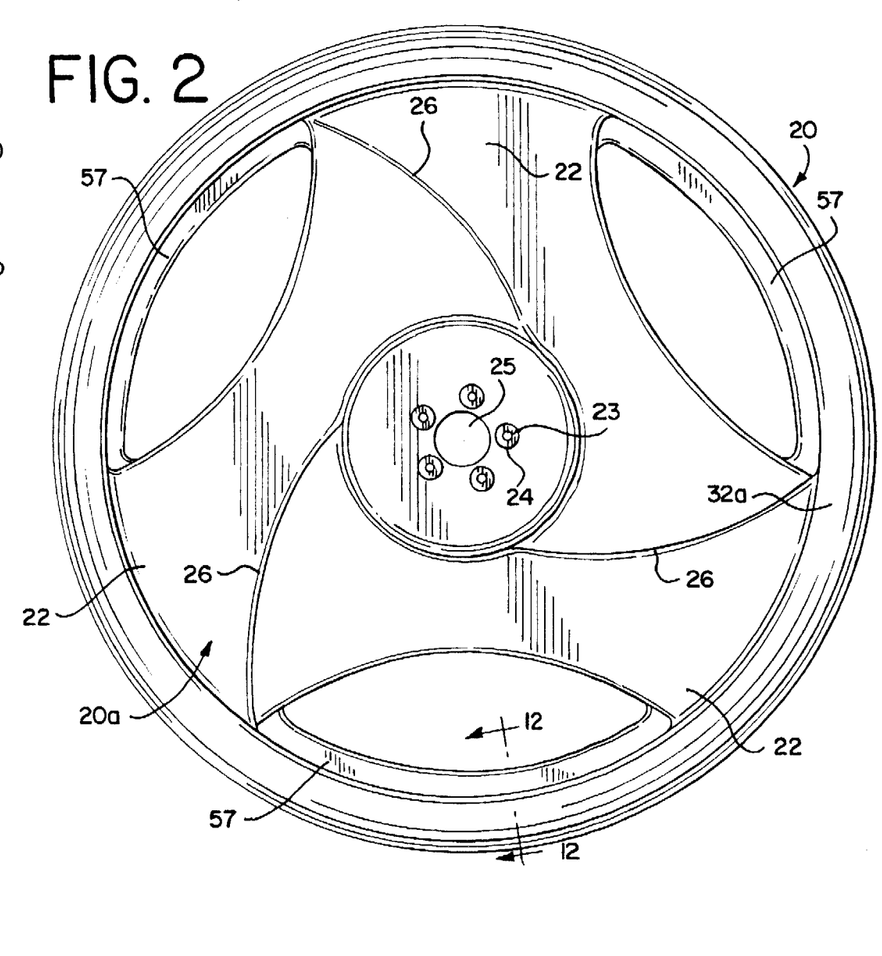
FIG. 2 is a side elevational view of the outside of the plastic wheel of FIG. 1.
Figure 3:
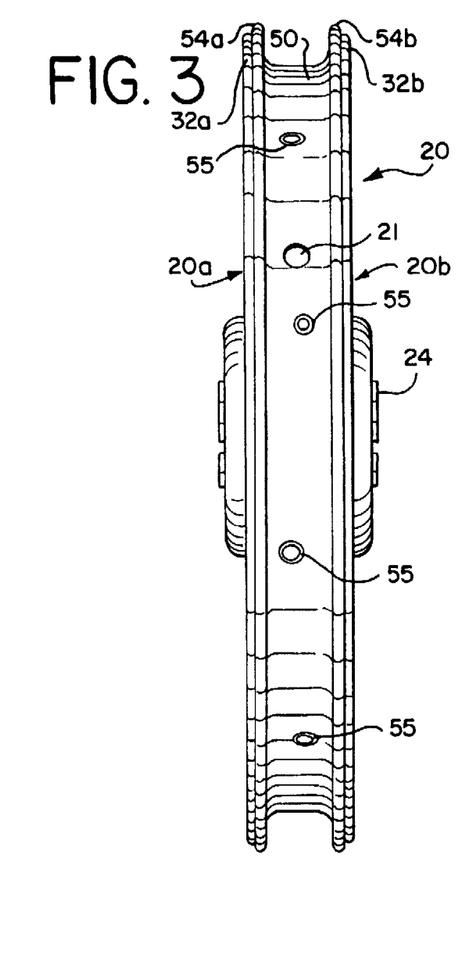
FIG. 3 is an end elevational view of the plastic wheel of FIG. 1.
Figure 4:
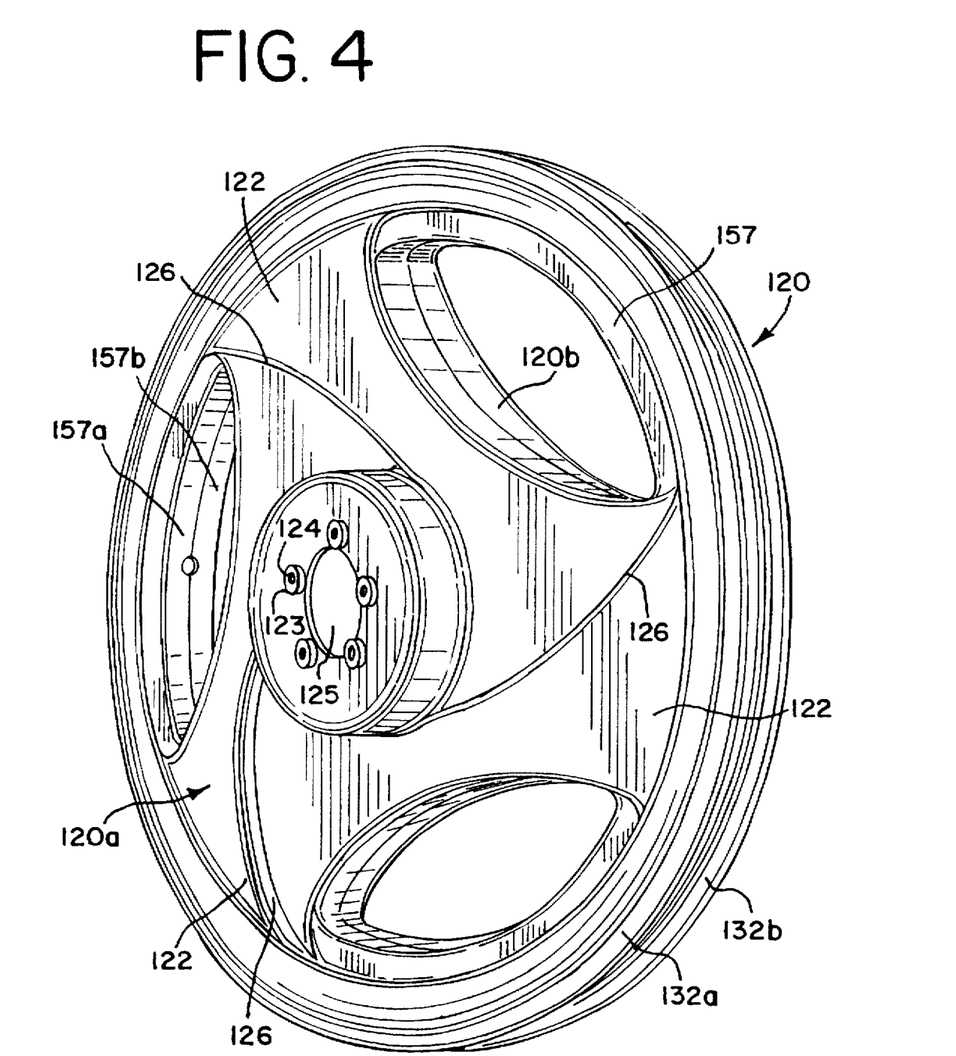
FIG. 4 is a perspective view of a plastic wheel of the present invention used as a rear wheel for a bicycle.
Figure 5:
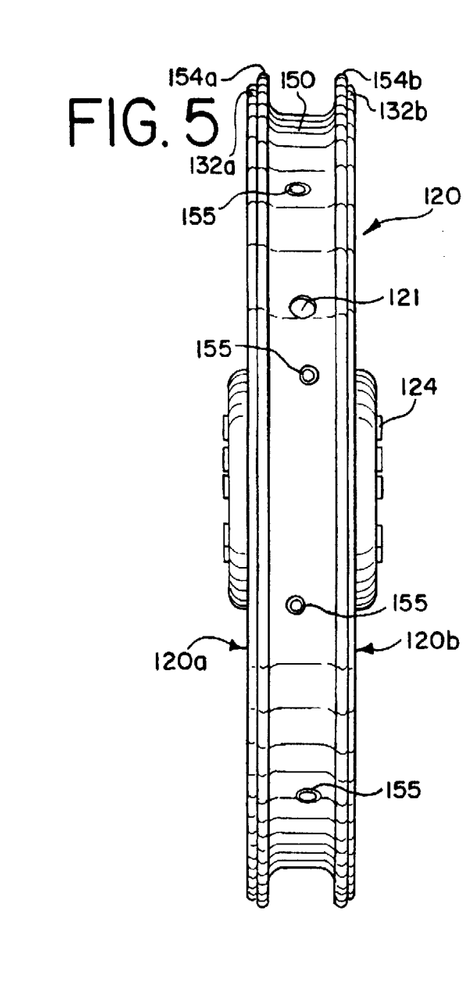
FIG. 5 is an end elevational view of the plastic wheel of FIG. 4.
Figure 6:
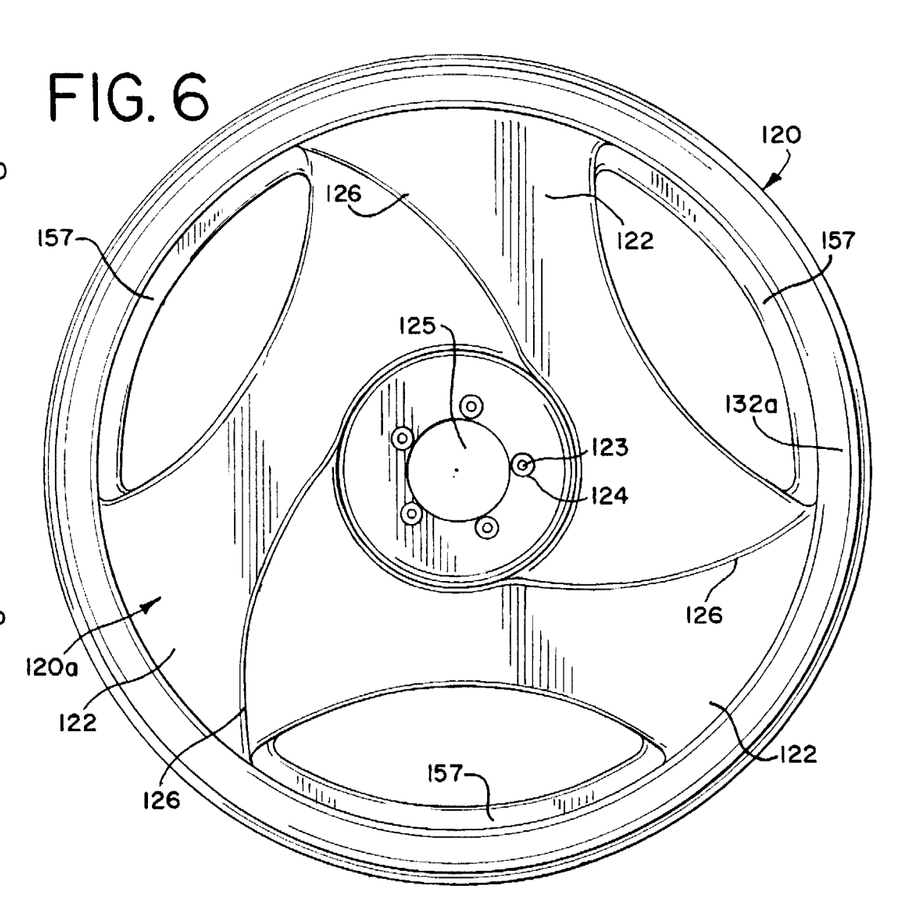
FIG. 6 is a side elevational view of the outside of the plastic wheel of FIG. 4.

The plastic wheel 20 is attached to the hub assembly 40 by rivets 49 through the hub flanges 42a and 42b and the overlapping portion of the plastic wheel. Instead of numerous holes where wire spokes would normally connect to the hub flanges, the hub flanges 42a and 42b preferably include only five holes 43 in each flange which mate with the holes 23 on the plastic wheel 20 (FIGS. 1, 2 and 8).

Figure 12:
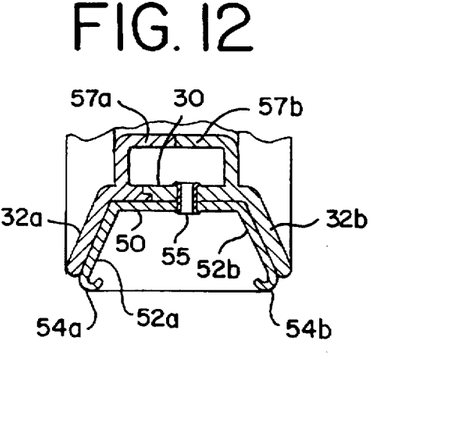
FIG. 12 is an enlarged cross-sectional view taken along line 12—12 of FIG. 2.

The rim 50 also is of a standard design except that it is modified since no wire spokes connect to it. The rim 50 is preferably made of metal so that it can have adequate strength. As seen in FIGS. 7 and 12, the rim 50 has two side walls 52a and 52b that end in rolled edges 54a and 54b and are thus adapted to hold a tire (not shown) onto the rim 50 in a conventional manner.

Figure 11:
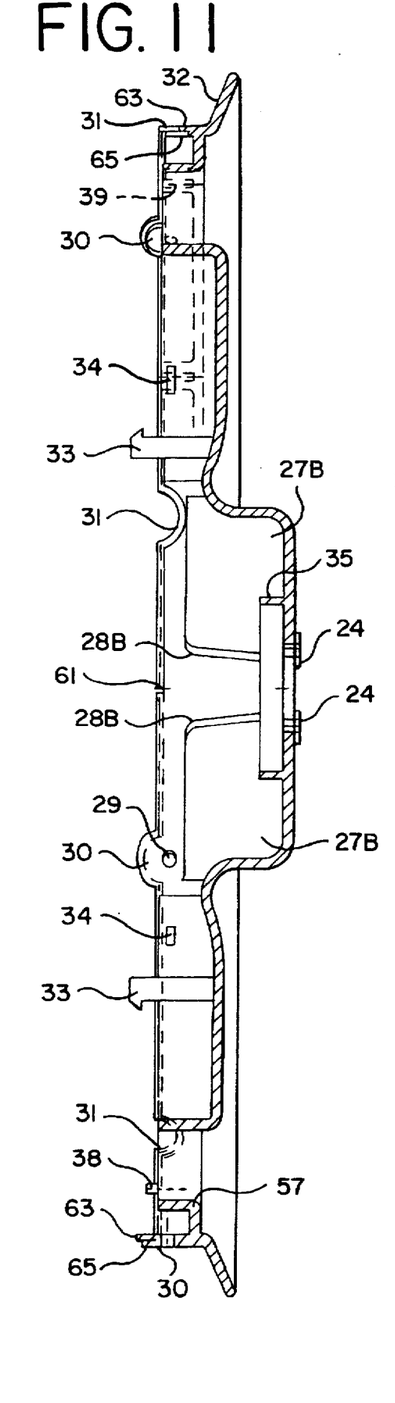
FIG. 11 is a cross-sectional view taken along line 11—11 of FIG. 8.

The rim is also preferably attached to the plastic wheel 20 by rivets 55. In this regard, the wheel 20 has holes 29 spaced around the circumference (FIGS. 7 and 11). These holes are provided adjacent to attachment tabs 30 formed on the wheel halves 20a and 20b. There, are also a plurality of indentations 31 around the circumference. Each wheel half has ten attachment tabs 30 with a hole 29 adjacent thereto and ten indentations 31. This allows for twenty rivets 55 to hold the rim 50 onto the wheel 20. Also, each attachment tab 30 fits into an indentation 31 when the two plastic wheel halves 20a and 20b are mated together. This prevents the two wheel halves from slideably rotating with respect to each other. The cover members 57 prevent the heads of the rivet 55 that extend through the wheel circumference in the spaces between the spokes 22 from being visible, thus adding to the aesthetic appearance of the wheel.

The plastic wheel 20 also includes two wheel flanges 32a and 32b (FIGS. 2, 7 and 11) that extend outwardly from the circumference of the wheel. For the preferred wheel made out of two separate wheel halves, each wheel flange is preferably attached to a separate wheel half. Preferably the wheel flanges 32a and 32b are molded as monolithic portions of the wheel half to which they are attached. As best seen in FIG. 7, preferably the wheel flanges 32a and 32b slope away from one another as they extend outwardly from the circumference. The wheel flanges 32a and 32b are adjacent to, and preferably in contact with, the rim side walls 52a and 52b. In this way the rim 50 is in between the wheel flanges 32a and 32b. Also, the wheel flanges 32a and 32b are approximately the same height as, and extend parallel to, the rim side walls 52a and 52b. The combination of rivets 55 attaching the attachment tabs 30 to the rim 50 and the wheel flanges 32a and 32b contacting the rim side walls 52a and 52b assures that the rim 50 stays attached to the wheel 20 if side loads are imposed on the tire, and thus to the rim 50.

Preferably the plastic wheel halves 20a and 20b snap-fit together at several points midway between the rim 50 and the hub assembly 40. As seen in FIGS. 7 and 8, each wheel half 20a and 20b is preferably provided with three hook members 33 and three ledges 34 that are connected by snap fitting, the hook members 33 on one wheel half bending over and snapping in behind the ledge member 34 on the opposite wheel half as the two wheel halves 20a and 20b are forced together. Also, the plastic wheel halves 20a and 20b preferably include guide pins 38 and receiving holes 39 (FIGS. 8 and 11) which help make sure that the wheel halves are properly aligned when snapped together.

When the plastic wheel 20 is assembled, one of the wheel halves is connected to the rim 50 and then the other wheel half is connected to the combination of the first wheel half and rim. The rivets 55 can be applied to hold the first wheel half to the rim 50 before or after the second wheel half is connected to the rim 50. The hub assembly 40 is preferably connected to the plastic wheel halves with the plastic wheel halves on the outside of the flange. The hub assembly 40 is thus on the inside of the plastic wheel. In this regard the hub assembly 40 will be connected to one wheel half before the second wheel half is connected to the combination of the first wheel half and rim 50. Preferably the hub assembly 40 and rim are riveted to one plastic wheel half and then the second plastic wheel half is riveted to this combination. Alternatively, the rim 50 and the first wheel half are riveted together and the hub assembly 40 and second wheel half are riveted together, and then both of these combinations are brought together and the first wheel half is riveted to the hub assembly 40 and the second wheel half is riveted to the rim 50. Preferably the pieces will stay connected to one another when assembled before any rivets are used to attach the pieces together. The snap-fit wheel halves helps hold the connected pieces together while the entire wheel assembly 10 has the rivets applied to firmly attach the rim 50 and hub flanges 42a and 42b to the wheel halves 20a and 20b. Once the pieces are riveted together, the rim 50 holds the wheel halves 20a and 20b together at the circumference of the wheel and the hub assembly 40 holds the wheel halves at the proper, spaced relationship at the center of the wheel.

As best shown in FIG. 11, the mating edges of the two wheel halves 20a and 20b do not intersect on a flush surface, but rather include a lip 63 and shoulder 65. This lip 63 and shoulder 65 extend around the entire mating perimeter of each wheel half, including the tabs 30 and indentations 31, except for the inflation stem hole 21. However, as noted earlier, since each wheel half is preferably identical, on one half of the wheel the lip 63 is on the outside of the circumference of the wheel half, and on the other half it is on the inside of the circumference. The lip 63 and shoulder 65 change places at a point 61 (FIG. 11) opposite the inflation stem hole 21. The overlap of the lip 63 on one wheel half with the shoulder 65 on the other wheel half helps keep the outside perimeter of the wheel halves in a mating relationship and prevents one wheel half from sliding laterally with respect to the other wheel half.

The rear wheel assembly 110 (FIGS. 4-6 and 9-10) is just like the front wheel assembly 10 except that the hole 125 in the center of the plastic wheel halves 120a and 120b is larger of course the rear hub assembly 140 is for a rear wheel, and preferably includes power transmission and coaster brake components. A chain sprocket of standard design can be attached to the hub assembly 140 on the right side as seen in FIG. 9 and a brake arm attached on the left side, as is standard for rear bicycle wheels. The holes 123 (FIG. 10) are also spaced further apart then the holes 23 on the front wheel 20 (FIG. 8) because the flanges 142a and 142b on the rear wheel hub assembly 140 have a larger diameter than the flanges 42a and 42b on the front wheel hub assembly 40. In all other respects, the front and rear wheels are the same, and so similar reference numbers, increased by an addend of 100, are used on FIGS. 4-6 and 9-10 to designate elements equivalent to those described above.

The preferred plastic wheels are molded out of a prime polypropylene, such as Type SB821 from Montell USA Inc, Wilmington, Del. This material provides a tough, light weight wheel. However, because the wheel flanges 32a and 32b do not have to directly hold an inflated pneumatic tire onto the wheel, nor take the direct impact when the wheel hits an object, the wheels do not need to be molded out of fiber filled plastic, or be made using expensive fiber and plastic composite. Therefore the plastic wheels of the present invention can be produced at less of a cost than typical plastic "mag wheels." Of course it is possible to mold the wheels out of fiber filled plastic, such as glass filled nylon, and in some cases, depending on wall thicknesses, wheel sizes and other factors, it may be preferable to use glass filled nylon. While the plastic wheels may cost slightly more than traditional wire spoke wheels, they are more aesthetically appealing than wire spoke wheels, and do not require hand tightening or adjustment of the spokes. The fact that the wheel halves cover up the hub flanges also adds to the aesthetic appearance of the wheels.

While the wheels 20 and 120 are shown with three spokes, and three ridges 26 on both side surfaces of the wheel, a different number of spokes could be used or a different number of ridges, or ridges having other shapes. If cross wind stability were not a concern, the wheels could be made without spokes, i.e. with solid surfaces between the hub and the rim. Also, holes other than holes between spokes could be made through the wheels.

The snap-fit hook members and ledges help hold the wheel halves together at the midpoint of the wheels and thus promote the aesthetic appearance. However, in other embodiments gaps between the wheel halves may be desired.

The wheel flanges of the described embodiments are solid and surrounding the entire circumference of the wheel.

However, the flanges could be of many different configurations and still provide contact with the rim 50. For example, the wheel flanges could be made out of sections with space in between them, or flanges shorter than the rim side walls may also be used.

One additional advantage of the preferred embodiment of the present invention comes from the fact that the plastic wheel halves are preferably made by injection molding. It may be preferable to mold into the wheel a name or logo. This would add to the aesthetic appearance of the wheel, and could be coordinated with other design concepts used on the bicycle to which the wheel would be attached. This name or logo could be easily changed by using an interchangeable mold insert. Thus wheel halves could be molded with the trademark of one company and then the mold insert changed and subsequent molded wheel halves could then show the trademark of a second company It should be appreciated that the apparatus and methods of the present invention are capable of being incorporated in the form of a variety of embodiments, only a few of which have been illustrated and described above. The invention may be embodied in other forms without departing from its spirit or essential characteristics. The described embodiments are to be considered in all respects only as illustrative and not restrictive, and the scope of the invention is, therefore, indicated by the appended claims rather than by the foregoing description. All changes which come within the meaning and range of equivalency of the claims are to be embraced within their scope.

We claim:

1. A wheel assembly comprising:
   a) a hub assembly comprising an axle and a bearing assembly;
   b) two molded plastic wheel halves connected to said hub assembly so as to form a wheel rotatable about said axle and having a circumference, said wheel halves including a plurality of stiffening ribs extending generally radially on the inside of the plastic wheel halves and terminating at free ends spaced from the hub assembly; and
   c) a rim attached to said circumference and having two side walls adapted to hold a tire onto said rim.

2. The wheel assembly of claim 1 wherein the rim is metal.

3. The wheel assembly of claim 1 wherein the hub assembly further comprises a hub housing and two hub flanges, one on each end of the hub housing.

4. The wheel assembly of claim 3 wherein the plastic wheel halves are each riveted to one of said hub flanges.

5. The wheel assembly of claim 3 wherein the plastic wheel halves connect to the hub assembly on the outside of said hub flanges.

6. The wheel assembly of claim 1 wherein the plastic wheel halves each include a wheel flange adjacent one of the rim side walls.

7. The wheel assembly of claim 1 wherein the plastic wheel halves are snap-fit together.

8. The wheel assembly of claim 1 wherein the plastic wheel halves are riveted to the rim.

9. The wheel assembly of claim 1 wherein the plastic wheel halves mate at the wheel circumference.

10. The wheel assembly of claim 9 wherein the plastic wheel halves have a plurality of attachment tabs spaced around the circumference.

11. The wheel assembly of claim 10 wherein the plastic wheel halves each have a plurality of indentations spaced around the circumference, the indentations of one wheel half mating with the attachment tabs of the other wheel half.

12. The wheel assembly of claim 1 wherein the two plastic wheel halves are identical to one another.

13. The wheel assembly of claim 1 wherein the plastic wheel halves are spaced apart from one another on the hub assembly.

14. The wheel assembly of claim 1 wherein the wheel has a plurality of spokes and spaces therebetween.

15. The wheel assembly of claim 14 wherein the wheel has three spokes.

16. The wheel assembly of claim 1 having outer surfaces extending between the hub assembly and the rim and wherein the outer surfaces include a plurality of curved ridges.

17. A wheel assembly comprising:
   a) a plastic wheel having a circumference with a plurality of stiffening ribs extending generally radially on the inside of the wheel and two wheel flanges extending outwardly from said circumference;
   b) a rim attached to said plastic wheel on said circumference and in between the wheel flanges, the rim having two side walls adapted to hold a tire onto the rim and the rim side walls contacting the wheel flanges; and
   c) a hub assembly having an axle and a bearing assembly, the wheel being attached to the hub assembly so as to allow the wheel to rotate about the axle, and the stiffening ribs terminating at free ends spaced from the hub assembly.

18. The wheel assembly of claim 17 wherein the rim is metal.

19. The wheel assembly of claim 17 wherein the rim is riveted to the plastic wheel.

20. The wheel assembly of claim 17 wherein the wheel flanges slope away from one another as they extend outwardly from the circumference.

21. The wheel assembly of claim 17 wherein the plastic wheel comprises two molded plastic wheel halves connected together.

22. The wheel assembly of claim 21 wherein the wheel halves mate with one another at the wheel circumference.

23. The wheel assembly of claim 21 wherein each of the two wheel flanges is attached to a separate wheel half.

24. The wheel assembly of claim 23 wherein the wheel flanges are molded as monolithic portions of the wheel half to which they are attached.

25. The wheel assembly of claim 17 wherein the wheel flanges are approximately the same height as, and extend parallel to, the rim side walls.

26. A method of making a wheel assembly comprising the steps of:
   a) providing
      i) first and second molded, plastic wheel halves each having a plurality of stiffening ribs extending generally radially on the inside thereof and a wheel flange thereon,
      ii) a rim having two side walls adapted to hold a tire onto said rim, and
      iii) a hub assembly;
   b) connecting said first wheel half to the rim to form a combination;
   c) connecting the second wheel half to the combination of the first wheel half and rim such that the wheel flanges on the first and second wheel halves contact the rim side walls; and
   d) connecting the hub assembly to one of the wheel halves before connecting the second wheel half to the combination of the first wheel half and rim, the stiffening ribs terminating at free ends spaced from the hub assembly.

27. The method of claim 26 comprising the step of riveting the first wheel half to the rim.

28. The method of claim 27 wherein the second wheel half is connected to the combination of the first wheel half and rim prior to the first wheel half and rim being riveted together.

29. The method of claim 27 wherein the first wheel half is riveted to the rim before the second wheel half is connected to the combination of the first wheel half and rim.

30. The method of claim 26 wherein the second wheel half is connected to the combination of the first wheel half and rim by snap-fitting the first and second wheel halves together.

31. The method of claim 26 wherein the hub assembly comprises a hub housing with first and second hub flanges, one on each end thereof, and the step of connecting the hub assembly to one of the wheel halves comprises attaching one of the hub flanges to the respective wheel half.

* * * * *